(12) United States Patent
Nookala et al.

(10) Patent No.: US 8,045,515 B2
(45) Date of Patent: Oct. 25, 2011

(54) SYSTEMS, METHODS, AND APPARATUS FOR QUALITY OF SERVICE PROCESSING

(75) Inventors: Sriram Nagesh Nookala, San Diego, CA (US); Bidhu Mohanty, San Diego, CA (US); Jun Wang, La Jolla, CA (US); Uppinder Singh Babbar, San Diego, CA (US); Venugopal Ramamurthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 609 days.

(21) Appl. No.: 11/489,909

(22) Filed: Jul. 19, 2006

(65) Prior Publication Data

US 2007/0058545 A1 Mar. 15, 2007

Related U.S. Application Data

(60) Provisional application No. 60/701,314, filed on Jul. 19, 2005.

(51) Int. Cl.
*H04W 4/00* (2009.01)

(52) U.S. Cl. .............. 370/329; 370/332; 455/452.2; 455/161.3

(58) Field of Classification Search ............ 370/229, 370/328; 455/435.3; 709/234
See application file for complete search history.

(56) References Cited

U.S. PATENT DOCUMENTS

| | | | | |
|---|---|---|---|---|
| 6,119,167 A * | 9/2000 | Boyle et al. | | 709/234 |
| 6,169,895 B1 | 1/2001 | Buhrmann et al. | | |
| 6,577,628 B1 * | 6/2003 | Hejza | | 370/392 |
| 6,738,361 B1 * | 5/2004 | Immonen et al. | | 370/328 |
| 6,845,100 B1 | 1/2005 | Rinne | | 370/395.43 |
| 7,006,472 B1 * | 2/2006 | Immonen et al. | | 370/332 |
| 7,039,039 B2 | 5/2006 | Cheong et al. | | |
| 7,136,395 B2 | 11/2006 | Lupien et al. | | |
| 7,478,161 B2 * | 1/2009 | Bernet et al. | | 709/228 |
| 2004/0008632 A1 | 1/2004 | Hsu | | 370/252 |
| 2004/0047366 A1 | 3/2004 | Chowdhury | | |
| 2004/0260951 A1 | 12/2004 | Madour | | 713/201 |
| 2005/0094611 A1 * | 5/2005 | Cheong et al. | | 370/342 |
| 2005/0141527 A1 | 6/2005 | Gateva | | 370/401 |

(Continued)

FOREIGN PATENT DOCUMENTS

WO 03007544 1/2003

(Continued)

OTHER PUBLICATIONS

Chuah, M. C. et al. Quality of service in third-generation IP-based radio access networks. Bell Labs Tech. J. 7(2), pp. 67-89 (2002).

(Continued)

*Primary Examiner* — Nick Corsaro
*Assistant Examiner* — Isaak R Jama
(74) *Attorney, Agent, or Firm* — Alexander Chen (57) ABSTRACT

A method of signal transmission according to one embodiment includes requesting a packet data serving node to filter a specified traffic flow from among a stream of packets. The method also includes requesting a radio access network to provide an indicated quality-of-service (QoS) treatment for the flow over a wireless air interface. The method further includes rescinding the request to filter or the request to provide a QoS treatment in response to a failure of the other request.

23 Claims, 9 Drawing Sheets method M100

U.S. PATENT DOCUMENTS

| | | | | |
|---|---|---|---|---|
| 2005/0169171 | A1* | 8/2005 | Cheng et al. | 370/229 |
| 2005/0201324 | A1* | 9/2005 | Zheng | 370/328 |
| 2006/0182119 | A1* | 8/2006 | Li et al. | 370/395.52 |
| 2006/0246900 | A1* | 11/2006 | Zheng | 455/435.3 |

FOREIGN PATENT DOCUMENTS

| | | |
|---|---|---|
| WO | WO03105442 | 12/2003 |
| WO | WO2005015413 | 2/2005 |
| WO | WO 2005020597 | 3/2005 |

OTHER PUBLICATIONS

Guo, K et al. Providing end-to-end QoS for multimedia applications in 3G wireless networks. Proc. SPIE ITCom 2003 Conf. Internet Multimedia Mgmt. Syst., Sep. 2003. 14 pp.

Mohanty, B. et al. 3GPP2 QoS Procedures: a stage 2 description. Feb. 9, 2004. Last accessed Jul. 17, 2006 at ftp.3gpp2.org/TSGA/Working/2004/0209-Seoul/TSG-A.3/A30-20040209-019A%20QC%20QoS%20Concepts.pd. 3 pp.

Vasudevan, M. et al. Setup procedures for flow-based QoS. Last accessed Jul. 17, 2006 at ftp.3gpp2.org/TSGA/Working/2004/0823-Osaka/TSG-A.3/A30-20040823-007-FlowSetup-NT.pdf. 12 pp.

Wang, J. et al. The cdma2000 QoS, as developed in TSG-X. Last accessed Jul. 17, 2006 at ftp.3gpp2.org/TSGA/Working/2004/0920-Clearwater/TSG-A+C+X%20QoS/X00-20040920-024-QoS%20presentation.pdf. 24 pp.

X.S001-004-D, v1.0, Feb. 2006. cdma2000 Wireless IP Network Standard: Quality of Service and Header Reduction. Last accessed Jul. 17, 2006 at www.3gpp2.org/Public_html/specs/X.S0011-004-D_v1.0_060301.pdf. 72 pp.

S.P0079-A, v0.2, May 24, 2006. Support for End-to-end QoS, Stage 1 Requirements. Last accessed Jul. 17, 2006 at ftp.3gpp2.org/V&V/S.P0079-A_VV_Due_23 _Jun.-2006.doc. 17 pp.

Wang, J. Additional Clarifications for IS-835-D. Oct. 24, 2005. Last accessed Jul. 17, 2006 at ftp.3gpp2.org/TSGX/Working/2005/2005-10/TSG-X-2005-10-Beijing/WG3-PSN/SWG31-PDS/X31-20051024-013%20R1%20QCOM%20Additional%20TFT%20Clarifications%20(IS-835-D).doc. 69 pp.

PN-3-4732-RV4 (to be published as TIA-835.4-D). front matter and Chapters 3 (Quality of Service) and 4 (Header Reduction). Last accessed Jul. 17, 2006 at ftp.3gpp2.org/TSGX/Projects/X.P0011-D%20Wireless%20IP%20Network/PN-3-4732-RV4-chapter4.pdf. 70 pp.

Letter from Ms. Betsy Kidwell (Chair, 3GPP2 TSG-X) to mr. George Turnipseed (Chair, 3GPP2 TSG-A), dated Jul. 19, 2004. Last accessed Jul. 17, 2006 at ftp.3gpp2.org/TSGX/Working/2004/2004-07/TSG-X-2004-07-LA/WG3-PSN/SWG31-PDS/X31-20040719-xxx-QCOM%20TSG-A-liaison-QoS.doc. 8 pp.

ETSI TS 123 107 V6.3.0 "Digital cellular telecommunications systems (Phase 2+)," ETSI Standards, European Tlecommunications Standards Institute, Sophia-Antipo, FR, vol. 3-SA2, No. V630, Jun. 2005, XP014030493 ISSN: 0000-0001.

International Search Report-PCT/US2006/028097, International Search Authority—European Patent Office—Dec. 12, 2006.

Written Opinion-PCT/US2006/028097, International Search Authority—European Patent Office—Dec. 12, 2006.

International Preliminary Report on Patentability-PCT/US2006/028097, International Search Authority—The International Bureau of WIPO—Geneva, Switzerland—Jan. 22, 2008.

CDMA2000 Wireless IP Network Standard: Introduction, 3GPP2 X.S0011-001-C Version1.0.0, 3GPP2, August in 2003, the full text.

cdma2000 Wireless IP Network Standard: Quality of Service and Header Reduction, 3GPP2 X. S0011-004-C Version 1.0.0, 3GPP2, August in 2003, the full text.

* cited by examiner

SYSTEMS, METHODS, AND APPARATUS FOR QUALITY OF SERVICE PROCESSING

RELATED APPLICATIONS

This application claims benefit of U.S. Provisional Patent App. No. 60/701,314, entitled "METHOD AND APPARATUS FOR SAVING AIR INTERFACE RESOURCES,", filed Jul. 19, 2005.

FIELD OF THE INVENTION

This invention relates to wireless communications.

BACKGROUND

Examples of applications of wireless communications include cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies, or any other frequencies upon which networks for wireless voice and/or video telephony may operate. Various over-the-air interfaces have been developed for cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (referred to collectively below as IS-95), and proposed high-data-rate systems are promulgated by the Telecommunications Industry Association (TIA, Arlington, Va.) and other well-known standards bodies.

Cellular telephone systems configured to comply with a version of an IS-95 standard employ CDMA signal processing techniques to provide highly efficient and robust cellular telephone service. Exemplary cellular telephone systems configured substantially in accordance with the use of one or more of the IS-95 standards are described in U.S. Pat. Nos. 5,103,459 and 4,901,307.

The IS-95 standards subsequently evolved into third-generation or "3G" systems for wireless cellular telephony, such as cdma2000 and WCDMA, which provide more capacity as well as high-speed packet data services. Variations of cdma2000 include cdma2000 1xRTT (radio transmission technology, also called "1x"), as described in the documents IS-2000 (TIA) and C.S0001 to C.S0006 (Third Generation Partnership Project 2 (3GPP2), Arlington, Va.), cdma2000 1xEV-DO (1x Evolution—Data Optimized, also called "DO" or High Rate Packet Data ("HRPD")), as described in the document IS-856 (TIA), DO-Revision A as standardized in C.S20024-A (also known as IS-856A), entitled "cdma2000 High Rate Packet Data Air Interface Specification," v. 1.0, March 2004 or v. 2.0, July 2005 (3GPP2), and cdma2000 1xEV-DV (1x Evolution, Data/Voice). A 1x system offers a peak data rate of 153 kbps, while an HRPD system offers a set of data rates ranging from 38.4 kbps to 2.4 Mbps, at which an access point (AP) may send data to a subscriber station (also referred to as a mobile station (MS) or access terminal (AT)). Because the AP is analogous to a base station in a system for cellular telephony, the terminology with respect to cells and sectors in such a system for wireless packet data services is the same as with respect to voice systems.

Given the growing demand for wireless data applications, the need for very efficient wireless data communication systems has become increasingly significant. One such wireless data application is the transmission of data packets that originate or terminate at packet-switching networks. Various standardized techniques exist for transmitting packetized traffic over packet-switching networks so that information arrives at its intended destination. One class of such techniques is described in the Wireless IP Network Standard IS-835 (e.g., document IS-835D), which specifies operations of Packet Data Serving Nodes (PDSN). A PDSN is responsible for establishing, maintaining, and terminating a packet data session with an access terminal, such as a Point-to-Point Protocol (PPP) session over the Internet.

A subscriber station may be configured to execute various applications that receive data from and/or transmit data to the network. These applications may have very different tolerances and requirements in terms of how this data is transported (also called "quality of service" or "QoS" requirements). Non-real-time applications such as e-mail and file transfer (e.g., mp3 files) have variable bandwidth requirements but lax delay and loss requirements. Retransmission of missing or corrupted frames may be useful in non-real-time applications. Telephony applications may have low bandwidth requirements but have low tolerance for frame delay and for variability in the delay (also called "jitter"). Typically the latency from one handset to the other should not exceed 250 msec, and jitter should not exceed 20 msec. While the RLP (Radio Link Protocol) commonly used on a cdma2000 air interface allows for retransmission of frames, such retransmission is not useful for real-time traffic.

A subscriber station may also be configured to execute one or more multimedia applications having different QoS requirements. Streaming of audio and/or video content can tolerate some degree of startup delay and can be buffered to increase tolerance to jitter, while bandwidth and loss tolerance characteristics may vary depending on the particular codec. Interactive applications such as online gaming typically have low bandwidth requirements but very strict delay requirements. Video conferencing has high bandwidth requirements and also requires low delay and jitter.

It may be desirable to support QoS on a per-application-flow basis. A particular QoS treatment for a flow may be negotiated between two points of a packet data transmission (e.g., between a subscriber station and a base station, or between a subscriber station and a PDSN). A request for a particular QoS treatment may specify the bandwidth of the traffic channel, the scheduling of packet data, the scheduling of transmission packets over-the-air, delay sensitivity of the contents, or other factors that may be deemed relevant by a network carrier or service provider. Obtaining a desired level of service may involve requesting QoS processing operations from more than one network entity (e.g., from a base station and from a PDSN).

SUMMARY

A method of signal transmission according to an embodiment includes transmitting a request to separate, from among a stream of packets, a flow of packets that match at least one indicated criterion. The method also includes transmitting a request to map the flow of packets, according to an indicated quality-of-service (QoS) treatment, onto a wireless air interface. The method further includes transmitting, in response to a failure of one among the request to separate and the request to map, a rescission of the other among the request to separate and the request to map.

A method of signal transmission according to another embodiment includes transmitting, to a packet data serving node, a request to install a packet filter. The method also includes transmitting a request to map, onto a wireless air interface and according to an indicated QoS treatment, a flow of packets matching the packet filter. The method further includes transmitting, in response to a failure of one among the request to install and the request to map, a rescission of the other among the request to install and the request to map.

An apparatus for wireless communications according to an embodiment includes means for generating a request to separate, from among a stream of packets, a flow of packets that match at least one indicated criterion. The apparatus also includes means for generating a request to map the flow of packets onto a wireless air interface according to an indicated quality-of-service (QoS) treatment. The apparatus also includes means for generating, in response to a failure of one among the request to separate and the request to map, a rescission of the other among the request to separate and the request to map.

DETAILED DESCRIPTION

Although cdma2000 and 1x terminology is primarily used in this description, it is expressly contemplated and hereby disclosed that embodiments may be configured for use in other third-generation (3G) technologies, such as WCDMA (Wideband CDMA). A WCDMA standard is set forth in Documents Nos. 3G TS 25.211, 3G TS 25.212, 3G TS 25.213, and 3G TS 25.214 (Third Generation Partnership Project (3GPP), Sophie Antipolis, FR). A WCDMA system is typically embodied as a UMTS (Universal Mobile Telecommunications System), which may include a Universal Terrestrial Radio Access Network (UTRAN) in communication with a GPRS packet-switched core network. The WCDMA standard describes a radio interface for an IMT-2000 (International Mobile Telecommunications) system, which may support High Speed Downlink Packet Access (HSDPA).

Figure 1:
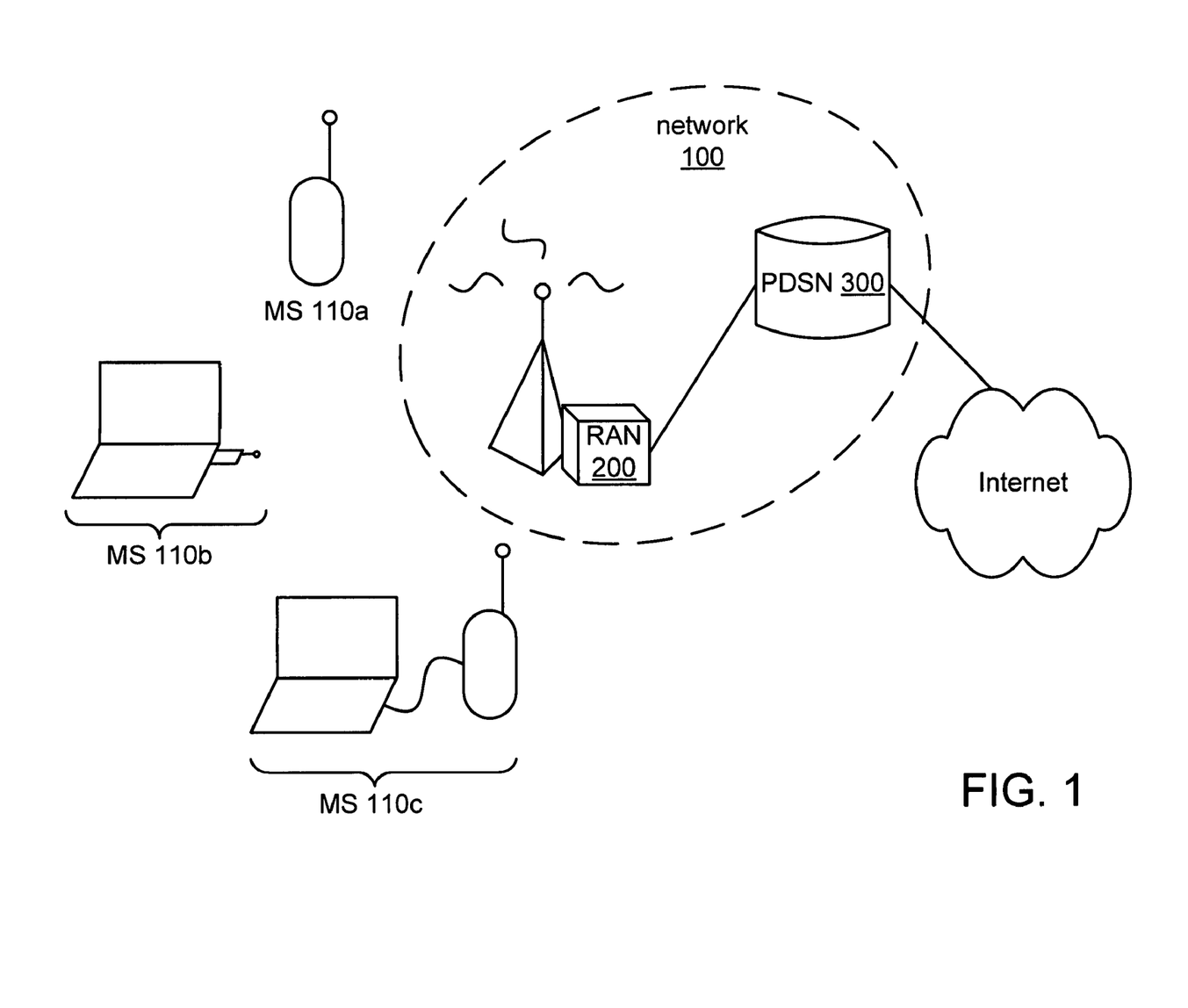
FIG. 1 shows one example of a wireless communication context including a network 100 for packet data service.

Embodiments include methods of QoS processing and systems and apparatus configured to perform one or more such methods. FIG. 1 shows one example of a context in which such an embodiment may be applied. This example includes one or more mobile stations (MSs) 110 and a network 100 for packet data service, which may be configured to support communications according to one or more standards such as those listed herein.

On a physical level, an MS 110 includes radio-frequency circuitry, such as a transceiver, for transmitting a signal to and receiving a signal from network 100. The MS may also include digital-to-analog and analog-to-digital converters and other analog and/or digital signal processing circuitry. Depending on its implementation, the MS may also include user interface elements such as a keyboard, a display screen, a microphone, and a speaker. An MS also typically includes one or more embedded processors or IP cores configured to execute applications and/or control functions. Other common names for an MS include User Equipment (UE) and Access Terminal (AT).

FIG. 1 shows examples of three different implementations 110$a,b,c$ of Mobile Station (MS) 110. The example MS 110$a$ is implemented as a cellular telephone. An MS may also include a combination of more than one apparatus, as shown in the examples MS 110$b$ and 110$c$. Each of these examples includes a Terminal Equipment (TE), such as a laptop computer, and a Mobile Terminal (MT), such as a PCMCIA card including a wireless modem or a cellular telephone, that provides wireless data communications capability to the TE, possibly through a Terminal Adapter (TA).

Network 100 includes a radio access network (RAN) 200 configured to communicate with one or more MSs over a wireless air interface. In the context of FIG. 1, a mobile station (MS) 110 is configured to communicate with RAN 200 for packet data service and possibly for other services such as circuit-switched telephony. In one example, the wireless air interface is a Um interface that complies with a version of the IS-2000 standard. A RAN commonly includes such elements as a base transceiver system (BTS) or "base station" that interfaces with one or more MSs, a base station controller (BSC) that controls one or more BTSs, and a packet control function (PCF) that interfaces with a packet data serving node (PDSN).

Network 100 also includes a PDSN 300 (also called a packet data switching node or a network access server) configured to communicate with one or more RANs over a wired or optical link, such as an Ethernet link, or over a wireless backhaul. Via the RAN, the PDSN communicates with one or more MSs desiring or engaged in a packet data communication, acting as the first-hop router for IP traffic to and from the MS. Other implementations of network 100 include more than one PDSN (for example, a cluster of PDSNs).

Figure 2:
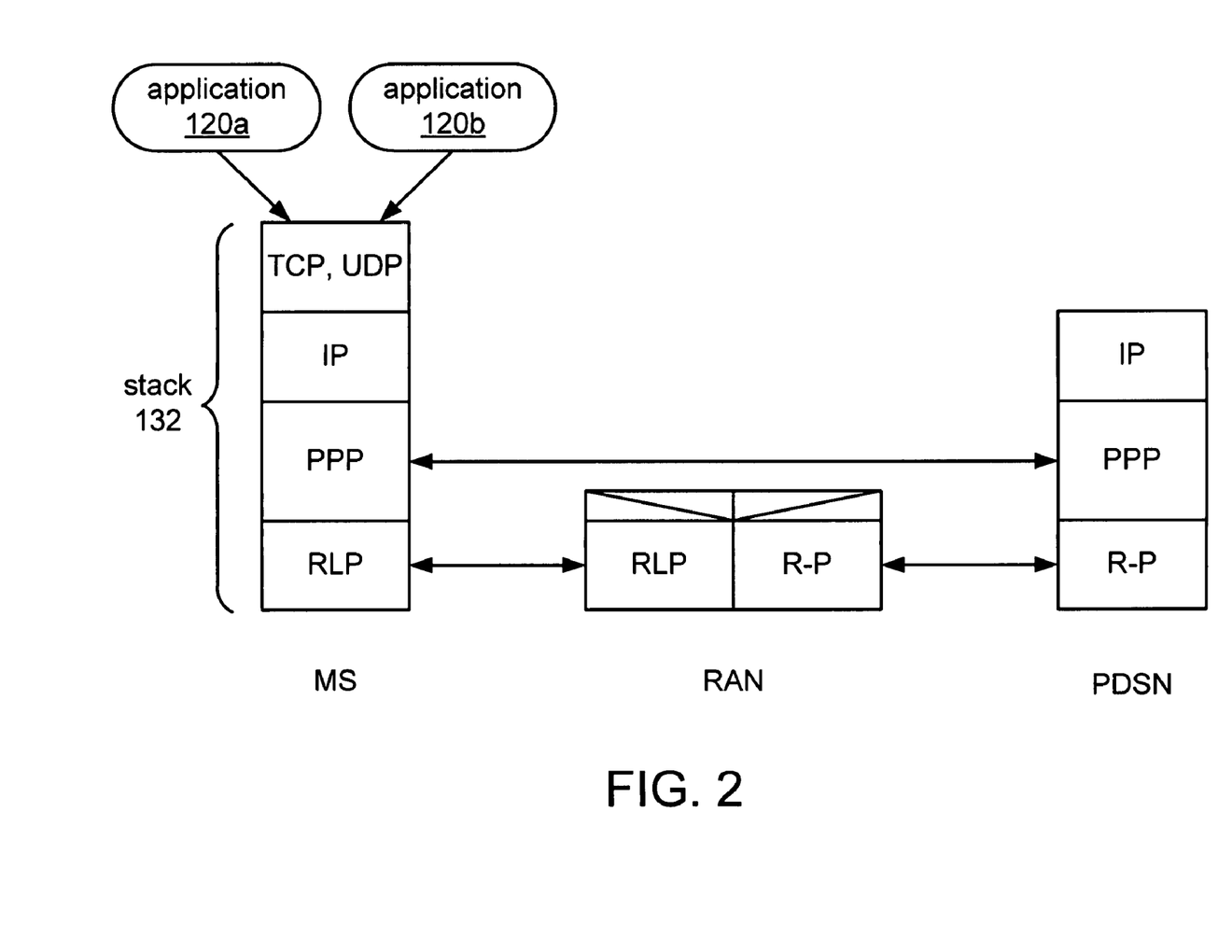
FIG. 2 shows one example of a portion of the protocol stacks of the entities illustrated in FIG. 1.

As shown in FIG. 2, MS 110 is configured to execute one or more applications 120. These applications communicate across network 100 with corresponding applications executing on servers (e.g., web servers) and/or on other terminals (e.g., other MSs). Examples of applications 120 include e-mail, web browsing, file transfer protocol (FTP), Voice over IP (VoIP), packet switched video telephony (PSVT), and television and other multimedia services. The MS may include video and/or audio codecs that support multimedia applications via the user interface (e.g., a display screen and speaker). The MS may also include a Session Initiation Protocol (SIP) user agent configured to communicate with another MS, or with a general IP video or voice telephony device, via a SIP server on the other side of PDSN 300 for packet-switched telephony services (e.g., VoIP or video telephony).

Communications among the various network entities and terminals occur via different layers of a stack of protocols. FIG. 2 shows one example of a portion of the protocol stacks of a MS, RAN, and PDSN as shown in FIG. 1. The protocol stack allows the MS to communicate with various logical entities in a communications network and/or with other terminals on the network. For example, an MS may be configured to communicate with the RAN over the air interface by using a link layer protocol such as RLP (Radio Link Protocol, as defined in TIA IS-707.2). Other commonly used protocols include transport layer protocols such as TCP (Transmission Control Protocol), UDP (User Datagram Protocol), and RTP (Real-time Transport Protocol, RFC 3550, July 2003, Internet Engineering Task Force (IETF, ietf.org)); network layer protocols such as IP (Internet Protocol) and RRC (Radio Resource Control); and data link layer protocols such as PPP (Point-to-Point Protocol).

As shown in FIG. 2, in some cases the MS and PDSN may communicate over a data link layer by establishing a PPP (Point-to-Point Protocol) connection. Alternatively, it may be desired to avoid one or more shortcomings of PPP-based transmission, such as additional header overhead and invisibility of packet boundaries to the RAN. For example, a system that operates according to Revision A of 1xEV-DO may obtain PPP-free operation via an enhanced packet application standard as set forth in C.S0063-0 v.1.15, entitled "cdma2000 High Rate Packet Data Supplemental Services" (3GPP2, October 2005). Another PPP-free scheme that may be used is described in U.S. Publ. Pat. App. No. 2002/0097701 (Lupien et al.), "METHOD AND SYSTEM FOR TRANSMISSION OF HEADERLESS DATA PACKETS OVER A WIRELESS LINK," published Jul. 25, 2002.

A "flow" is defined as a series of packets that belong to the same protocol instantiation and share the same source and destination. An IP flow, for example, is a unidirectional flow of IP packets with the same source IP address and port number, the same destination IP address and port number, and the same transport protocol. It may be desired to support the transmission of multiple traffic flows between the MS and PDSN for a single application and/or to support the transmission of different traffic flows between the MS and PDSN for different applications.

As discussed above, different applications may have different requirements in terms of quality of service parameters such as latency, bandwidth, and error tolerance. Compliance with such parameters may require distinguishing multiple flows from one another for transmission. If the air interface is configured as a single queue of packets, for example, latency-sensitive packets directed to a VoIP application executing on the MS may be delayed at the RAN, and thus become unusable, while an large ongoing transmission directed to another application (e.g., a one-megabyte web page directed to a web browser) occupies the air interface. Therefore, it is desirable to configure a packet data services network such as network 100 to support the transmission of different traffic flows according to different QoS assurances (also known as "flow-based QoS"), based on factors such as the requirements of the corresponding applications.

Figure 3:
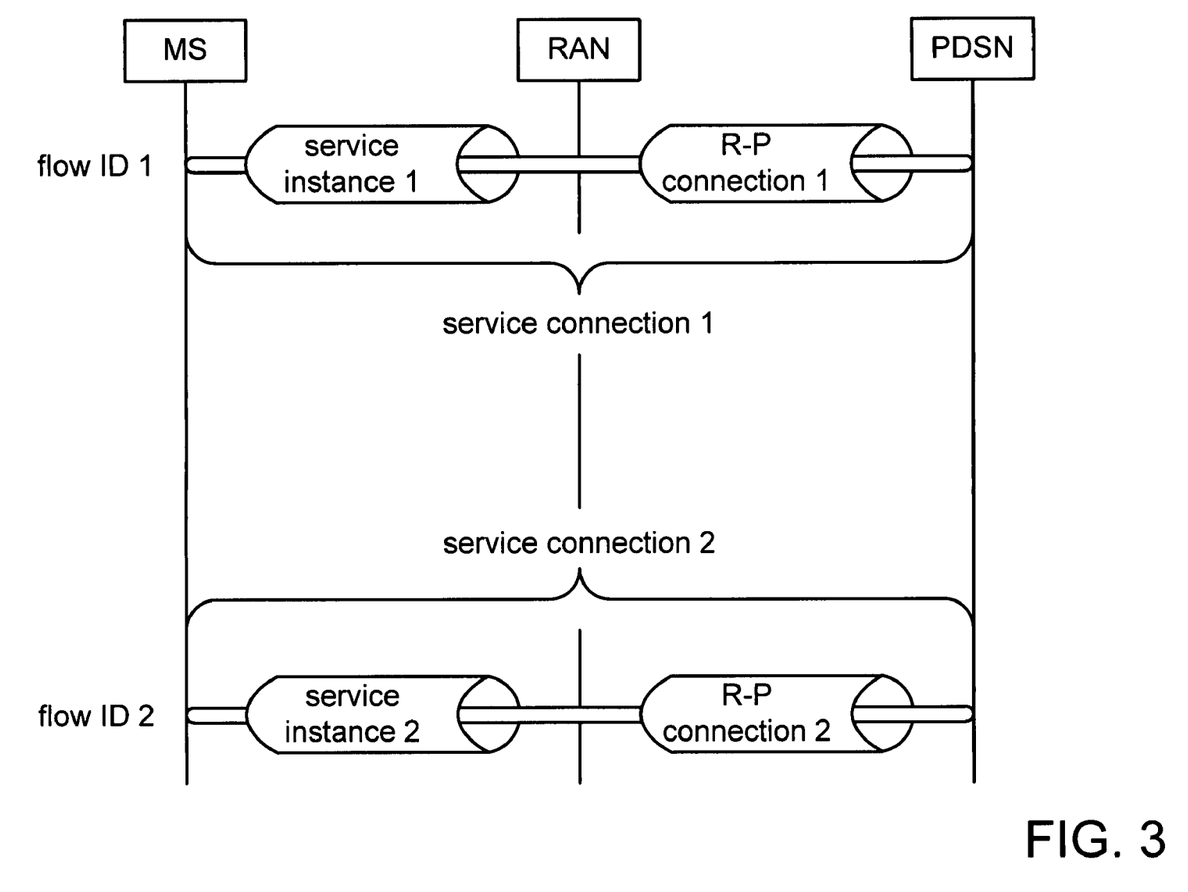
FIG. 3 shows one example of a transport path between an MS and a PDSN that includes two different service connections.

A "service connection" is a logical connection between the MS and PDSN that is used to transport user data to or from the MS. The transport path between the MS and PDSN may include more than one service connection configured to carry different traffic flows according to different QoS treatments. For example, the transport path may include one service connection to carry a TCP/IP flow and another service connection to carry an RTP video stream. FIG. 3 shows one example of a transport path between an MS and a PDSN that includes two different service connections, each configured to carry a corresponding traffic flow.

The portion of a service connection between the MS and RAN is called a "service instance" in 1x systems, while in HRPD systems a service instance is called a "link flow" or "RLP instance." The cdma2000 specification describes a network that supports up to six service instances per MS, each identified by a unique label called a Service Reference Identifier (SR_ID). A service instance may have associated QoS settings, and an MS may initiate multiple service instances during a packet call.

The air interface between the MS and the RAN may carry multiple service instances, each having different bandwidth, delay, and error characteristics. In 1X and HRPD systems, the air interface includes a main service instance and may include one or more auxiliary service instances. Voice and data may be defined and specified independently as different service options, and the air interface may support multiple service instances for one or both of these service options. In one example, the MS has a main service instance to carry one or more TCP/IP flows and an auxiliary service instance to carry an RTP video stream.

Figure 4:
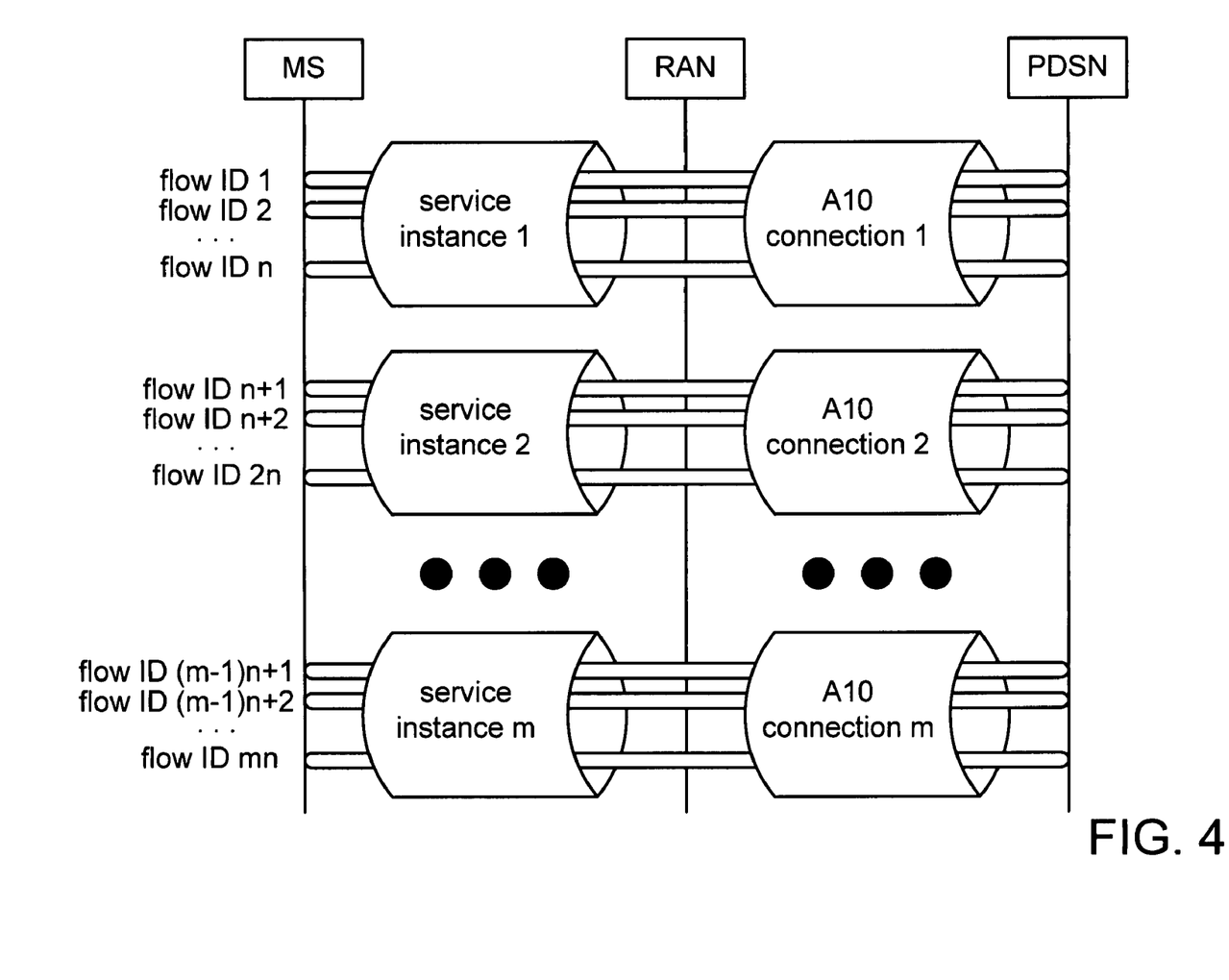
FIG. 4 shows one example of a transport path between an MS and a PDSN that includes multiple service instances and A10 connections.

The portion of a service connection between the RAN and the PDSN is called an "R-P connection" (for RAN-PDSN) and may be carried over an Ethernet link as mentioned above. In 1X and HRPD systems, the R-P interface is defined as the combination of the A10 and A11 interfaces, where the A10 interface carrier user traffic between the RAN and PDSN and the A11 interface carries signaling information between the RAN and PDSN. As shown in the example of FIG. 4, service instances and A10 connections may carry multiple flows, and separate instances of each (e.g., separate service connections) may be provided to support different QoS treatments. It may be desirable to assign flows having similar QoS requirements to the same service instance.

In 1X and HRPD systems, each service instance is associated with one A10 connection. On the forward link, the RAN maps an A10 connection to the corresponding service instance, and on the reverse link (i.e., from the MS to the RAN), the RAN maps a service instance to a corresponding A10 connection. It is possible that in other systems more than one service instance is associated with one R-P connection. For example, it is possible in such a system that an R-P connection may carry a flow that exceeds the bandwidth limit for a single service instance and is therefore split over two service instances.

Figure 5:
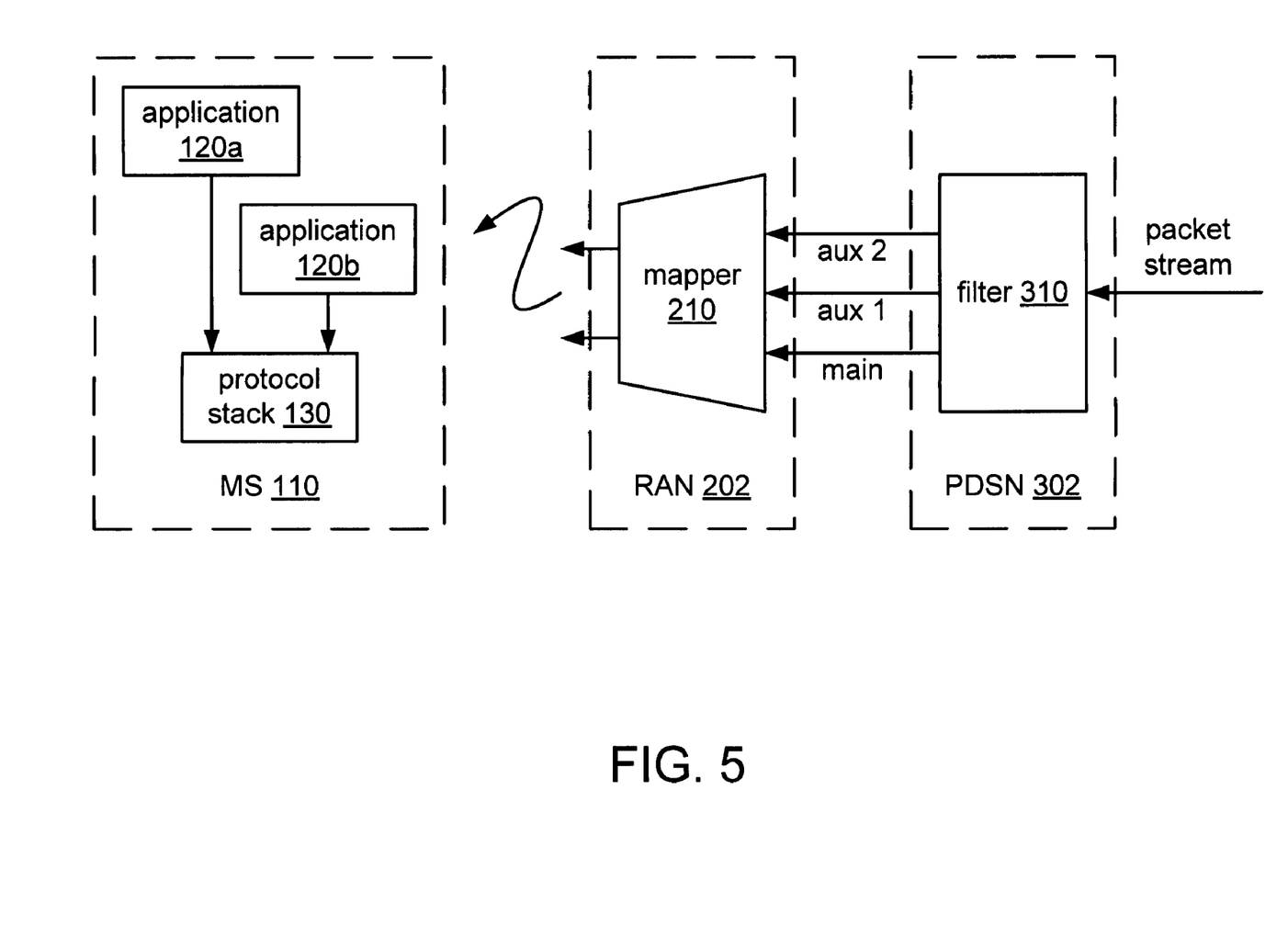
FIG. 5 shows a block diagram of one example of a logical structure that may be used to implement a forward-link transport path (i.e., from the RAN to the MS) as shown in FIGS. 3 and/or 4.

FIG. 5 shows a block diagram of one example of a logical structure that may be used to implement a forward-link transport path as shown in FIGS. 3 and/or 4. This structure includes implementations 202 and 302, respectively, of RAN 200 and PDSN 300. PDSN 302 includes a filter 310 configured to separate one or more traffic flows from among an incoming packet stream, and RAN 202 includes a mapper 210 configured to map the separate traffic flows to service instances based on a specified QoS treatment.

Mobile station 110 is configured to include a means for generating a request to separate, from among a stream of packets, a flow of packets that match at least one indicated criterion (e.g., an air interface control module) and to transmit the request to the PDSN. Mobile state 110 is also configured to include a means for generating a request to map the flow of packets onto a wireless air interface according to an indicated quality-of-service (QoS) treatment (e.g., a packet data control module) and to transmit the request to the RAN. Each such means for generating may be implemented in logic as, for example, one or more arrays of logic elements (such as gates or transistors) and/or one or more sets of instructions executable by one or more arrays of logic elements. For example, one or both such means may be implemented as one or more sets of instructions executable by one or more embedded processors.

Mapper 210 may be configured to map traffic flows onto physical channels of the wireless air interface. The physical channels may be multiplexed in time, frequency, and/or code space. In one example, a cdma2000 air interface between an MS and a RAN includes a fundamental channel (FCH) for user traffic, a dedicated control channel (DCCH) that may carry user traffic, and one or more supplemental channels (SCHs) for user traffic.

In some cases, a physical channel is used to carry more than one service instance. It is possible that mapper 210 is configured to map all of the service instances to one physical channel. In other cases, each physical channel is assigned to a different service instance type (e.g., corresponding to a particular protocol or similar QoS treatments) and may carry a multiplexed stream of flows of that type from different service instances. It is also possible for mapper 210 to map a service instance to different physical channels at different times. Mapper 210 may be implemented in logic as, for example, one or more arrays of logic elements (such as gates or transistors) and/or one or more sets of instructions executable by one or more arrays of logic elements.

Mapper 210 may include one or more schedulers that are each configured to schedule packets for transmission over one or more physical channels. Such a scheduler may be implemented in logic as, for example, one or more arrays of logic elements (such as gates or transistors) and/or one or more sets of instructions executable by one or more arrays of logic elements. In one simple case, a scheduler is configured to select packets from each corresponding flow in a round-robin fashion, with packets from different flows being scheduled in successive frames. In other cases, a scheduler is configured to give priority to real-time applications. For example, a scheduler may be configured to recognize flow profile IDs (as described below) that correspond to telephony applications, such as VoIP or PSVT.

At the PDSN, filter 310 distinguishes one or more incoming traffic flows and sends them to the RAN over separate A10 connections. A PDSN typically uses packet filtering to distinguish particular data flows and map each one to an A10 connection associated with the corresponding service instance. In this context, packet filtering includes comparing information from the header of each packet to one or more packet filters, which are configured according to information provided by the MS. Filter 310 may be implemented in logic as, for example, one or more arrays of logic elements (such as gates or transistors) and/or one or more sets of instructions executable by one or more arrays of logic elements.

In existing systems for packet data services, the MS typically requests a specific QoS treatment for a given flow by negotiating separately with the RAN and the PDSN. For example, an MS may operate according to a version of the IS-856 standard (such as IS-856A) to negotiate a QoS treatment with the RAN for the air interface. Such negotiation may include sending a request for the RAN to map the flow onto the air interface according to a QoS treatment. The MS may also operate according to a version of the IS-835 standard (such as IS-835D) to send a request for the PDSN to install one or more packet filters that may be used to separate the flow from among a stream of packets.

In a typical cdma2000 system, an MS indicates a desired QoS treatment by requesting a QoS block of bits (QOS_BLOB) in a signaling message to the RAN over the air interface. The entire QoS_BLOB applies to 1x, and it includes a QoS_SUB_BLOB that also applies to HRPD. A QOS_SUB_BLOB may include detailed QoS parameters indicating the desired QoS treatment for a corresponding flow, and a QOS_BLOB may contain QOS_SUB_BLOBs for more than one flow. For example, a QOS_SUB_BLOB may specify requested and/or acceptable values for parameters such as data rate, frame error rate, delay, latency, jitter, data loss rate, and/or flow priority.

Alternatively, instead of sending QoS parameter values for a flow, the MS may send another indication of the desired QoS treatment. For example, WCDMA and cdma2000 specifications define four classes of traffic for QoS purposes (conversational, streaming, interactive, and background), and the MS may indicate which of these classes is desired for the particular flow. In a further alternative, the MS indicates the desired QoS treatment for a flow by sending an index into a table of specified QoS treatments. One example of such an index is a flow profile ID (also called QoS Profile ID), which may be included in a QOS_SUB_BLOB. Table 13.1.1-1 of Document C.R1001-E (3GPP2) sets forth a list of 16-bit flow profile IDs, although flow profile IDs having other lengths (e.g., 8 bits) may also be used.

The MS may be configured to send the QoS request to the RAN over an access channel of the air interface. In a cdma2000 1x system, the MS may be configured to send the QoS request to the RAN in an Origination Message (OM) or Enhanced Origination Message (EOM). In a DO system, the MS may be configured to send the QoS request to the RAN in a Generic Attribute Update Protocol (GAUP) Message as described in the IS-856A standard. In other cases, the MS may be configured to send the QoS request to the RAN in a Service Request Message.

In addition to the QoS requirements for the dataflow, the QoS request from the MS to the RAN may indicate the direction of the requested data flow (i.e., forward or reverse) and may also include an identifier of the requested flow. In some cases, the MS is configured to select an unused SR_ID for the flow identifier.

In response to the QoS request from the MS, the RAN returns an acknowledgement such as a granted QoS BLOB. In cdma2000 1x system, the RAN may be configured to send the QoS grant to the MS in a Service Connect Message. In other cases, the RAN may be configured to send the QoS grant to the MS in a Service Response Message.

The RAN decides whether an existing service instance can be used to support the requested data flow or a new service instance is needed. If a new service instance is needed, then the RAN and the MS negotiate the set-up of the new service instance. The RAN may be configured to use the flow identifier selected by the MS as the SR_ID for the new service instance or, alternatively, to select another SR_ID for the new service instance. If an existing service instance is used, the RAN typically uses the corresponding SR_ID in its response to the QoS request. The RAN may be configured to use the granted QoS treatment to control parameters such as channel rate, power control, number of RLP retransmissions, and MAC (Media Access Control) parameters. If a new service instance is established, the RAN may also communicate with the PDSN to setup a new A10 connection.

Between the RAN and PDSN, flow-based QoS treatment in a cdma2000 system is supported by A10 connections. As the service instances are established between the MS and RAN, the RAN and PDSN establish corresponding A10 connections between them. The PDSN uses traffic flow templates (TFTs) provided by the MS to map traffic flows to the A10 connections.

To request QoS processing from the PDSN, the MS sends a Traffic Flow Template (TFT) to the PDSN. Such a request may be carried in an RSVP Resv message, where RSVP is an abbreviation for the Resource Reservation Protocol (RFC 2205, IETF, September 1997), which provides a mechanism for reserving transport resources over a signaling plane (e.g., as described in TIA document IS-835C). The TFT includes the IP address of the MS, a service reference identifier (SR_ID) that identifies the A10 connection to which the TFT corresponds, and a list of one or more packet filters.

Each packet filter includes a flow identifier (e.g., an 8-bit field) as assigned by the MS or RAN, a destination IP address, a destination port number, and a protocol type identifier. For example, a packet filter may include a five-tuple that indicates the top-layer protocol of the flow, the IP address and port number of the flow source, and the IP address and port number of the flow destination. A packet filter may also have a precedence value that indicates a priority among the packet filters. Formats for TFTs, packet filters, and Resv messages carrying them are described in detail in, for example, Annex B of the 3GPP2 document X.S0011-004-D v1.0, entitled "cdma2000 Wireless IP Network Standard: Quality of Service and Header Reduction," February 2006.

The RSVP Resv message may also indicate the direction of the new data flow (forward or reverse) and/or the end-to-end QoS parameters for the new data flow. The PDSN returns an RSVP ResvConf message when the QoS operation requested in the Resv message is granted, and a ResvErr message otherwise. The MS may also be configured to update the TFT when any of the TFT components change.

When an incoming packet arrives at the PDSN in the forward direction, the destination IP address is checked to determine which set of TFTs to use. Then the PDSN searches for a match among all packet filters in the TFTs belonging to that destination IP address. If an incoming forward packet matches a packet filter within a corresponding TFT, then the PDSN sends the packet to the RAN over the corresponding A10 connection. If an incoming forward packet does not match any packet filter within a corresponding TFT, then the PDSN sends the packet to the RAN over a main (or default) A10 connection. The same procedure is executed for reverse-link QoS processing, with the packet's source IP address being used instead.

The QoS treatments that are available to an MS may be limited in some manner. For example, an MS is typically limited to a maximum aggregate bandwidth for all application flows. The MS may also be authorized for certain QoS profile IDs, for a maximum per-flow priority, and/or for a maximum number of service instances.

The PDSN typically supports authorization of QoS options for the MS by obtaining a user QoS profile (also called "subscriber QoS profile") that corresponds to the MS. The user QoS profile typically includes a list of the user's authorized flow profile IDs, which may include flow profile IDs for PSVT and/or VoIP. In one example, the PDSN obtains the user QoS profile from an AAA (authentication, authorization, and accounting) entity during setup of the main service connection and forwards this profile to the RAN. The RAN may then be configured to reject requests for flow profile IDs that are not in the Authorized QoS Profile ID list for that subscriber.

The IS-835D and IS-856 standards were formulated to be interoperable. As these two standards are separate, however, unexpected operational issues may arise between them in practice. Since the MS must negotiate separately with each entity, for example, it may happen that negotiation of the MS with the RAN or with the PDSN does not occur or otherwise fails. The resulting condition may be sub-optimal in terms of leveraging network resources.

It is possible that the MS will make a QoS request to the RAN that is accepted and a corresponding QoS request to the PDSN which is refused (e.g., via a ResvErr message) or not acknowledged. A PDSN typically serves more than one RAN, for example, and its capacity for new A10 connections, TFTs, and/or packet filters may be currently exhausted. Alternatively, the PDSN may be down or otherwise unavailable. When such a QoS processing failure occurs, a service instance between the MS and RAN may nevertheless remain reserved for the flow according to the successful QoS request, which reservation reduces the amount of resources available to other subscriber stations.

Even if the RAN eventually determines that the service instance is not being used, the RAN may continue to reserve that resource for future use, as the IS-856 standard allows for an MS to operate in a dormant state. Such a condition is sub-optimal in that other subscriber stations may be denied access to the reserved but unused resources. Releasing unused air bandwidth for use by other services is important for maximizing service provider revenue. Thus it is desirable to conserve air interface resources that comply with a version of the IS-856 standard while satisfying the demands of packet data operations according to a version of the IS-835 standard.

Figure 6:
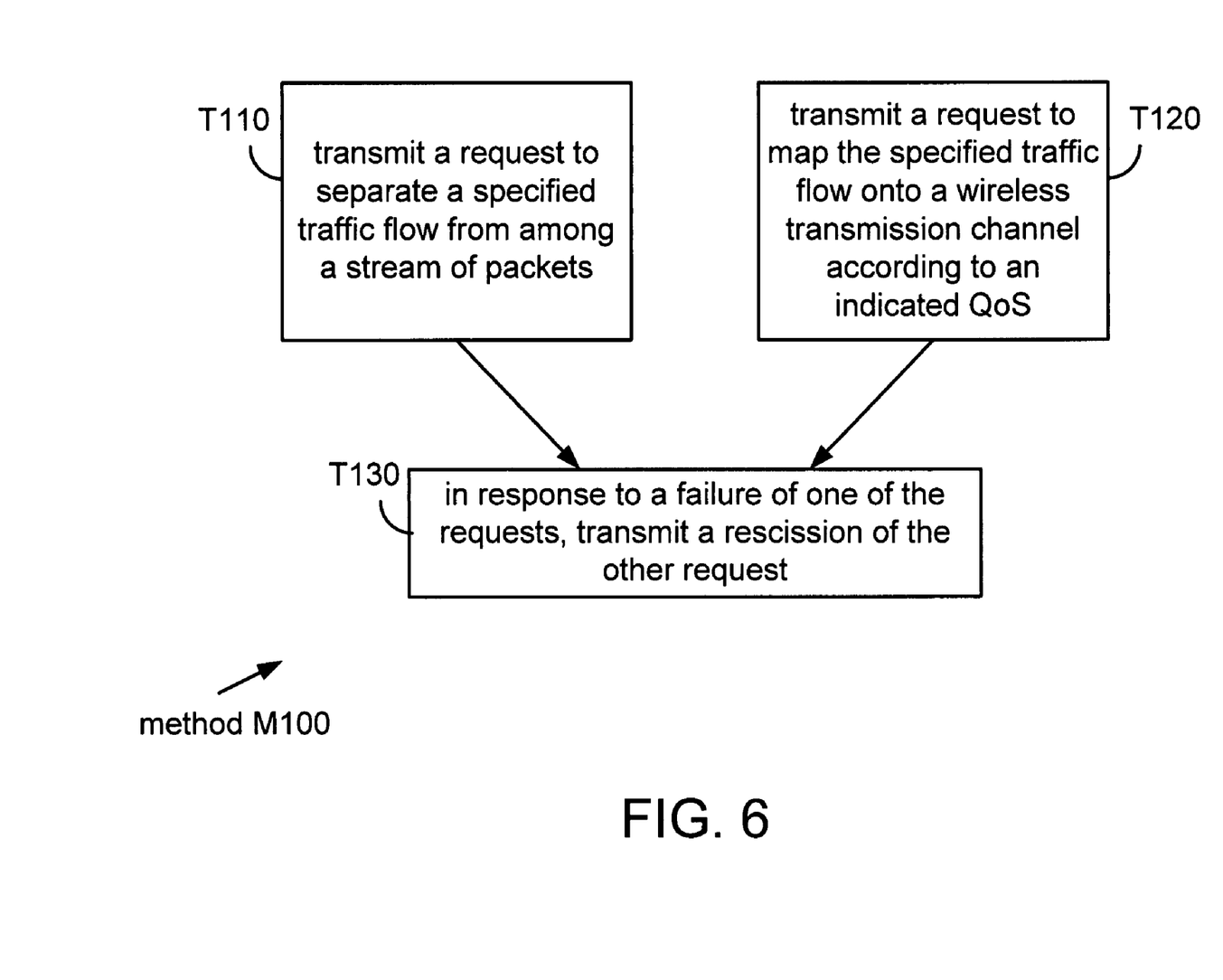
FIG. 6 shows a flowchart of a method M100 according to an embodiment.

FIG. 6 shows a flowchart of a method M100 according to an embodiment. Task T110 transmits a request to separate a specified traffic flow from among a stream of packets. Task T120 transmits a request to map the specified traffic flow over a wireless air interface according to an indicated quality of service. In response to a failure of one among the request to separate and the request to map, task T130 transmits a rescission of the other among the request to separate and the request to map.

The request to separate may include one or more packet filters, each specifying a different traffic flow. A packet filter indicates the destination of the traffic flow to be filtered from the stream of packets. As described above, a packet filter may include a five-tuple indicating the IP address and port number of the source of the traffic flow, the IP address and port number of the destination of the traffic flow, and the protocol of the traffic flow.

The request to map may include a flow identifier and an indication of a desired QoS treatment. The flow identifier may include the source and destination of the traffic flow. Alternatively, the flow identifier may be an index assigned by the MS or by the RAN. The request to separate may also include the flow identifier.

Figure 7:
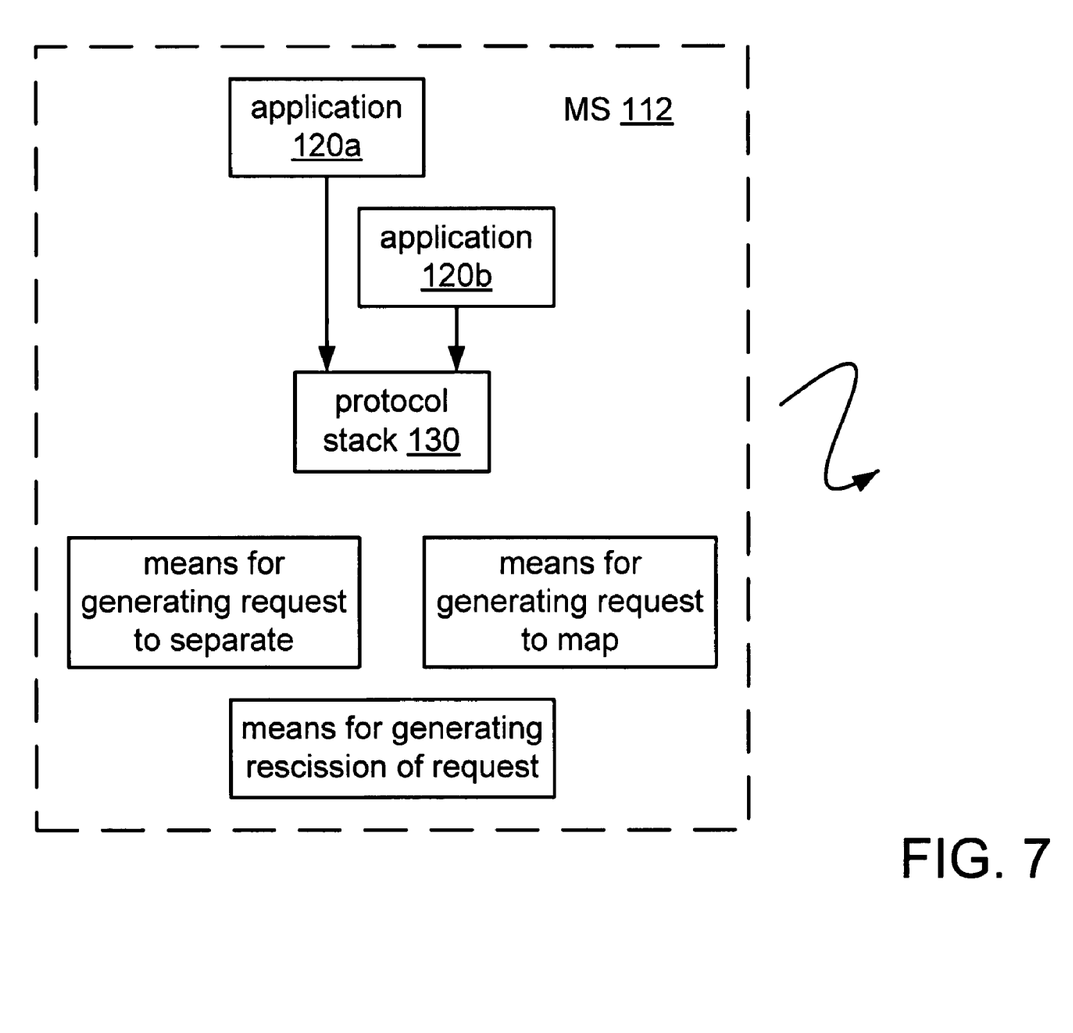
FIG. 7 shows a block diagram of an implementation 112 of MS 110.

An MS 110 may be configured to perform an implementation of method M100. In such case, the MS may include a means for generating, in response to a failure of one among the request to separate and the request to map, a rescission of the other among the request to separate and the request to map. Such means may be configured to determine the failure of one among the request to separate and the request to map based on a failure to detect an acknowledgement of the request within a predetermined time interval (e.g. according to the expiration of a timer). Such means may be implemented in logic as, for example, one or more arrays of logic elements (such as gates or transistors) and/or one or more sets of instructions executable by one or more arrays of logic elements. FIG. 7 shows a block diagram of such an implementation 112 of MS 110.

Figure 8:
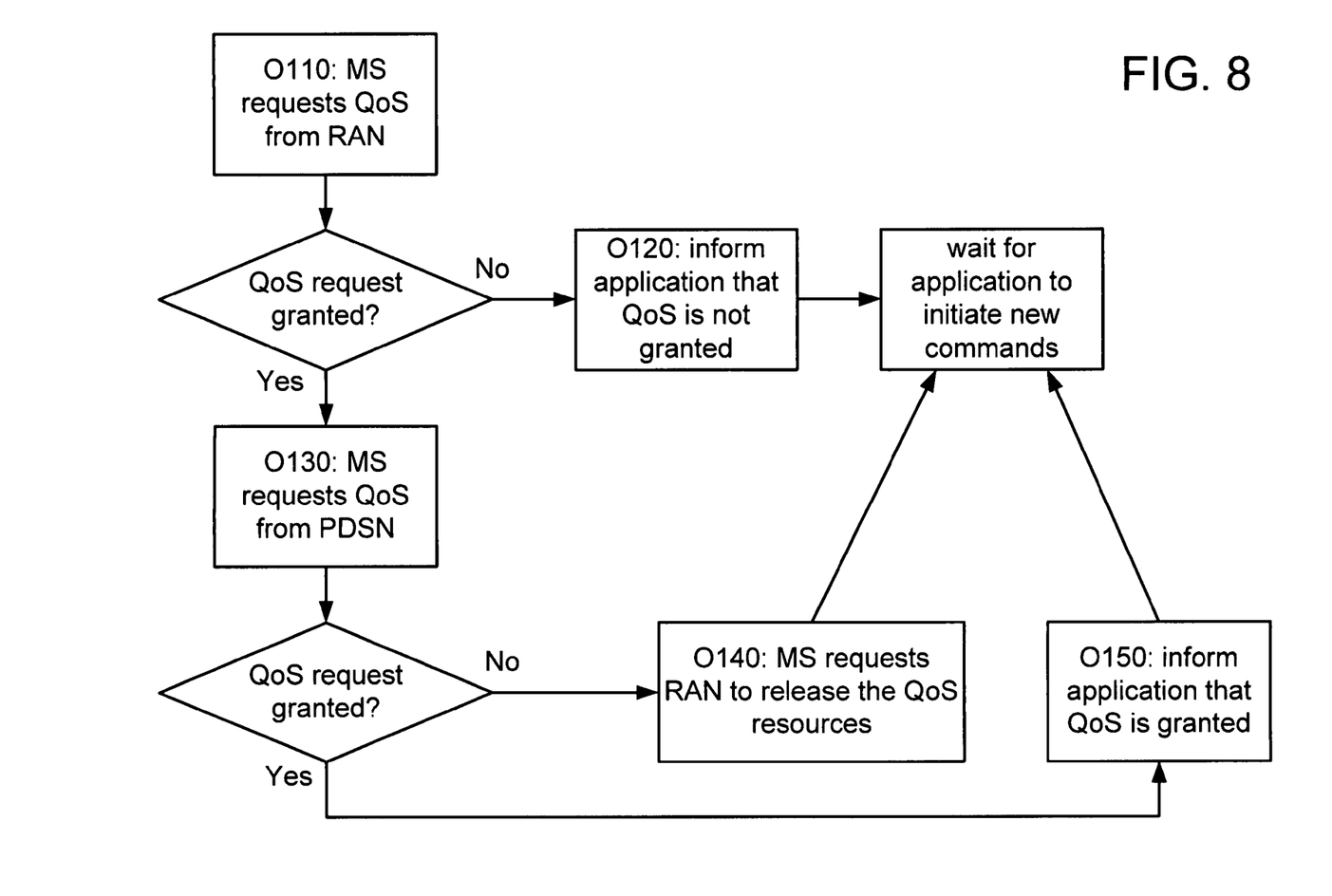
FIG. 8 shows a flowchart of a sequence of operations according to method M100.

FIG. 8 shows a sequence of operations according to method M100 as described above. In operation O110, an application executing on the MS causes the MS to request QoS processing from the RAN. For example, the MS may issue a request to map according to task T120. If the RAN does not grant the QoS request, then in operation O120 the MS informs the application that the QoS treatment is not granted, and the MS waits for the application to initiate new commands.

If the RAN grants the QoS request, then in operation O130 the MS requests QoS processing from the PDSN (or another network entity). For example, the MS may issue a request to separate according to task T110. If the PDSN does not grant the QoS request (e.g., the request is refused, or no acknowledgment is received within some time interval after transmission of the request), then in operation O140 the MS requests the RAN to release the QoS resources. Such an operation may be implemented, for example, by sending a QoS request having a flow profile ID equal to NULL. This NULL request indicates to the RAN that QoS resources reserved for the corresponding flow may be released. If the PDSN grants the QoS request, then in operation O150 the MS informs the application that the requested QoS treatment is granted, and the MS waits for the application to initiate new commands.

In another sequence of operations according to method M100, the MS sends the QoS request for a flow to the PDSN before receiving a response from a QoS request for the flow from the RAN (and possibly before sending the QoS request to the RAN). The QoS request to the RAN may be shorter (and thus more quickly transmitted) than the QoS request to the PDSN. For example, in some cases the QoS request to the RAN may be transmitted in one frame of 20 or 26 milliseconds, while transmission of the QoS request to the PDSN (such as an RSVP message containing a TFT) may take several frames to complete. The path between the MS and the RAN is also more direct than the path between the MS and the PDSN, such that a response to the QoS request to the RAN is typically received earlier than a response to the QoS request to the PDSN.

Alternatively, it may be desired to conserve PDSN resources when QoS negotiation between the MS and RAN for air interface resources fails. The MS may initiate over-the-air (OTA) QoS negotiation with the RAN and RSVP signaling with the PDSN simultaneously. If the OTA QoS negotiation with the RAN fails (e.g., a granted QoS BLOB is not received) but the RSVP signaling with the PDSN to create a TFT succeeds, resources on the PDSN may be unnecessarily occupied in filtering packets directed to the MS (e.g., unnecessarily installed TFTs and packet filters, and processing cycles wasted in filtering packets according to these filters). Due to the OTA QoS negotiation failure, any packets separated by the filters will be sent on the default A10 connection anyway.

In such case, the MS is configured to re-signal the PDSN, upon detecting failure of the OTA QoS negotiation and success of the RSVP QoS signaling, to delete the TFT and the packet filters associated with the TFT. The PDSN deletes the TFT and un-installs the packet filters associated with the TFT, thereafter delivering the packets directly to the primary A10 connection.

Figure 9:
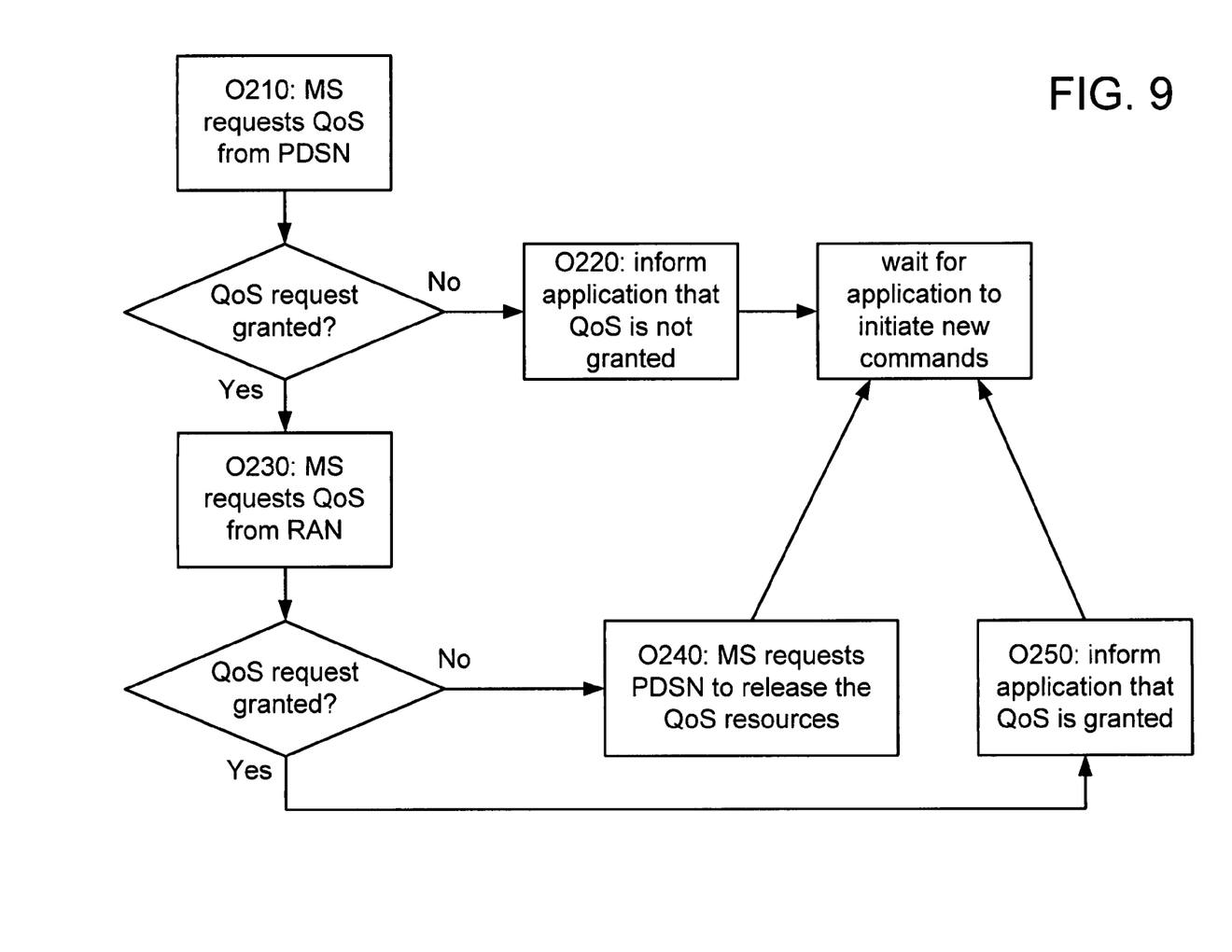
FIG. 9 shows a flowchart of another sequence of operations according to method M100.

FIG. 9 shows another sequence of operations according to method M100 as described above. In operation O210, an application executing on the MS causes the MS to request QoS processing from the PDSN (or another network entity). For example, the MS may issue a request to separate according to task T110. If the PDSN does not grant the QoS request, then in operation O220 the MS informs the application that the QoS treatment is not granted, and the MS waits for the application to initiate new commands.

If the PDSN grants the QoS request, then in operation O230 the MS requests QoS processing from the RAN. For example, the MS may issue a request to map according to task T120. If the RAN does not grant the QoS request (e.g., the request is refused, or no acknowledgment is received within some time interval after transmission of the request), then in operation O240 the MS requests the PDSN to release the QoS resources. Such an operation may be implemented, for example, by sending a TFT that includes the flow identifier and an opcode (operation code) that instructs the PDSN to delete the packet filters corresponding to that flow. If the RAN grants the QoS request, then in operation O250 the MS informs the application that the requested QoS treatment is granted, and the MS waits for the application to initiate new commands.

The application requesting QoS treatment may be any software module that requests access to the Internet or other packet-switched network. Processing elements and memory elements may be configured and arranged to carry out one or more sets of instructions to implement a method as described herein. For illustrative ease, embodiments have been described in the context of entities operating in accordance with IS-856 (e.g., IS-856A) and IS-835 (e.g., IS-835D) standards. However, embodiments may also be implemented and applied to any wireless technology in which a subscriber station is configured to request a QoS treatment for a particular traffic flow from a first entity configured to distinguish one or more specified traffic flows from among a stream of packets and from a second entity configured to map traffic flows separately onto an air interface.

The foregoing presentation of the described embodiments is provided to enable any person skilled in the art to make or use the present invention. Various modifications to these embodiments are possible, and the generic principles presented herein may be applied to other embodiments as well. For example, an embodiment may be implemented in part or in whole as a hard-wired circuit, as a circuit configuration fabricated into an application-specific integrated circuit, or as a firmware program loaded into non-volatile storage or a software program loaded from or into a data storage medium (such as removable or integrated semiconductor or other volatile or nonvolatile memory, or a magnetic and/or optical medium such as a disk) as machine-readable code, such code being instructions executable by one or more arrays of logic elements such as processors, microprocessors or other digital signal processing units, microcontrollers, or other finite state machines (whether such arrays or arrays are separate, integrated, and/or embedded).

Methods described herein may be tangibly embodied (for example, in one or more data storage media) as one or more sets of instructions readable and/or executable by a machine including an array of logic elements. Thus, the present invention is not intended to be limited to the embodiments shown above but rather is to be accorded the widest scope consistent with the principles and novel features disclosed in any fashion herein.

What is claimed is:

1. A method of signal transmission within a network, said method comprising:
    transmitting a first request from a mobile device to a first node to separate, from among a stream of a plurality of packet flows between the mobile device and the first node, a first flow of packets that match at least one indicated criterion;

transmitting a second request from the mobile device to a second node to map the first flow of packets onto a wireless air interface according to an indicated quality-of-service (QoS) treatment, wherein the mobile device is adapted to separately and directly negotiate with the first node and the second node to request a particular QoS treatment for the first flow of packets; and in response to a failure of either the first request to separate or the second request to map, transmitting a rescission request from the mobile device to rescind the other request that did not fail.

2. The method of signal transmission according to claim 1, wherein the indicated QoS treatment includes a requested data rate for the specified first flow.

3. The method of signal transmission according to claim 1, wherein the indicated QoS treatment includes an index into a table of QoS profiles.

4. The method of signal transmission according to claim 1, wherein the at least one criterion includes a specified destination address of the packets of the first packet flow.

5. The method of signal transmission according to claim 1, wherein the first request to separate includes a request to filter the stream of the plurality of packet flows according to a traffic flow template.

6. The method of signal transmission according to claim 1, wherein the first request to separate indicates at least one among a source address or a destination address common to each among the flow of packets.

7. The method of signal transmission according to claim 1, wherein at least one of the failure of the first request or the failure of the second request is indicated by a failure to detect an acknowledgement of either the first request or the second request within a predetermined time interval.

8. The method of signal transmission according to claim 1, wherein said transmitting the first request to separate comprises transmitting, to a packet data serving node, a request to filter the stream of packets according to a traffic flow template.

9. The method of signal transmission according to claim 1, wherein said transmitting a the second request to map comprises transmitting, to a radio access network, a request to transport the flow of packets over the wireless air interface according to the indicated QoS treatment.

10. A data storage medium having a set of machine-executable instructions that describes the method of signal transmission according to claim 1.

11. A method, operational on a mobile device, of signal transmission, said method comprising:

transmitting, from a mobile device to a packet data serving node, a first request to install a packet filter at the data serving node;

transmitting, from the mobile device to a network access node, a second request to map, onto a wireless air interface at the access node and according to an indicated quality-of-service (QoS) treatment, a flow of packets matching the packet filter, wherein the mobile device is adapted to separately and directly negotiate with the packet data serving node and the network access node to request a particular QoS treatment for the flow of packets; and in response to a failure of either the first request to install a packet filter at the data serving node or the second request to map, transmitting a rescission request from the mobile device to rescind the other request that did not fail.

12. A data storage medium having a set of machine-executable instructions that describes the method of signal transmission according to claim 11.

13. An apparatus for wireless communications, said apparatus comprising:

means for generating a first request for a data serving node to separate, from among a stream of a plurality of packet flows between the apparatus and the data serving node, a first flow of packets that match at least one indicated criterion;

means for generating a second request for a network access node to map the first flow of packets onto a wireless air interface according to an indicated quality-of-service (QoS) treatment, wherein the apparatus is adapted to separately and directly negotiate with the data serving node and the network access node to request a particular QoS treatment for the first flow of packets;

means for generating a rescission request to rescind one among the first request to separate or the second request to map in response to a failure of the other request that did not fail among the first request to separate or the second request to map.

14. The apparatus for wireless communications according to claim 13, wherein the indicated QoS treatment includes a requested data rate for the specified first flow.

15. The apparatus for wireless communications according to claim 13, wherein the indicated QoS treatment includes an index into a table of QoS profiles.

16. The apparatus for wireless communications according to claim 13, wherein the at least one criterion includes a specified destination address of the packet packets of the first packet flow.

17. The apparatus for wireless communications according to claim 13, wherein said means for generating a the first request to separate is configured to generate the first request to separate to include a request to filter the stream of packets according to a traffic flow template.

18. The apparatus for wireless communications according to claim 17, wherein said apparatus is configured to transmit the first request to separate to a packet data serving node.

19. The apparatus for wireless communications according to claim 13, wherein said means for generating a the first request to separate is configured to generate the first request to separate to indicate at least one among a source address or a destination address common to each among the flow of packets.

20. The apparatus for wireless communications according to claim 13, wherein said means for generating a rescission request is configured to determine the failure of the first request to separate or the second request to map based on a failure to detect an acknowledgement of either the first request or second request within a predetermined time interval.

21. The apparatus for wireless communications according to claim 13, wherein said means for generating a the second request to map is configured to generate the second request to map as a request to transport the flow of packets over the wireless air interface according to the indicated QoS treatment, and wherein said apparatus is configured to transmit the second request to map to a radio access network.

22. The apparatus for wireless communications according to claim 13, wherein said apparatus is an integrated circuit.

23. The apparatus for wireless communications according to claim 13, wherein said apparatus is a cellular telephone.

* * * * *